United States Patent
Sundkvist

(10) Patent No.: US 6,413,296 B1
(45) Date of Patent: Jul. 2, 2002

(54) RECOVERY OF GOLD FROM REFRACTORY ORES AND CONCENTRATES OF SUCH ORES

(75) Inventor: Jan-Eric Sundkvist, Skellefteå (SE)

(73) Assignee: Boliden Mineral AB (SE)

( * ) Notice: Subject to any disclaimer, the term of this patent is extended or adjusted under 35 U.S.C. 154(b) by 0 days.

(21) Appl. No.: 09/694,341

(22) Filed: Oct. 24, 2000

(30) Foreign Application Priority Data

Nov. 17, 1999 (SE) ................................ 9904141

(51) Int. Cl.$^7$ ............................ C22B 3/06; C22B 11/00
(52) U.S. Cl. ............................................ 75/744; 423/27
(58) Field of Search ............................... 75/744; 423/27

(56) References Cited

U.S. PATENT DOCUMENTS

| 4,552,589 A | 11/1985 | Mason et al. |
| 4,559,209 A | 12/1985 | Muir et al. |
| 5,162,105 A * | 11/1992 | Kleid et al. ............ 423/29 |
| 5,232,491 A | 8/1993 | Corrans et al. |
| 5,261,945 A | 11/1993 | Awadalla |

\* cited by examiner

*Primary Examiner*—Roy King
*Assistant Examiner*—Tima McGuthry-Banks
(74) *Attorney, Agent, or Firm*—Burns, Doane, Swecker, & Mathis, L.L.P.

(57) ABSTRACT

A method of increasing the leaching yield of gold in the cyanide treatment of refractory ores or concentrates of such ores, while delivering air in an alkaline environment at atmospheric pressure, wherein gold present in said ores or concentrates is bound as tellurides. The method is characterised by carrying out the cyanide treatment at a temperature above room temperature, up to a temperature immediately beneath the boiling point of the leaching liquid. The treatment is suitably carried out at a temperature of 60–80° C., and at a pH between 10 and 12.

5 Claims, No Drawings

RECOVERY OF GOLD FROM REFRACTORY ORES AND CONCENTRATES OF SUCH ORES

BACKGROUND OF THE INVENTION

1. Field on the Invention

The present invention relates to a method of increasing the leaching yield of gold in the cyanide treatment of refractory ores or concentrates of such ores while delivering air in an alkaline environment at atmospheric pressure, said ores or concentrates containing gold that is bound as tellurides.

2. Description of the Related Art

Gold is found partly in solid form, i.e. as pure metal, and partly in combination with other elements, for instance in the form of alloys and compounds. Finely divided ores that have low gold concentrations are conventionally treated hydrometallurgically, primarily by the so-called cyanide process in which the gold is dissolved in a sodium cyanide solution to form a cyanide complex. Gold is won from the resultant leaching solution, by precipitation with suitable less precious metals, for example finely divided zinc, or by adsorption on active carbon.

Refractory ores and concentrates are materials that cannot be processed readily to recover their valuable metal content, for instance materials in which gold and other valuable metals are bound as certain tellurides. Conventional cyanide leaching of ores and concentrates containing gold tellurides often result in slow kinetics and incomplete dissolution of the gold content. A large number of gold tellurides exist, of which many exhibit strong refractory properties. In the event that efforts are made to win the valuable metal content of such refractory materials with a cyanidation process, complicated and often expensive pre-treatment of the material is required, for instance chemical pre-treatment or roasting.

In addition to the extra treatment steps required, other drawbacks with the roasting of such materials reside in the emission of $SO_2$ and $As_2O_3$ in the roaster gas, sintering of the roasted product, coupled with the fact that the oxidation and reduction process is difficult to control. However, such pre-treatment is applied commercially at present in a plant on Fiji (Emperor Gold Mine) in combination with hypochlorite treatment.

In addition to hypochlorite treatment, other proposed chemical pre-treatment methods include leaching in a strong acid, for instance in hydrochloric acid, in order to remove tellur in an additional step prior to the cyanide process.

A large number of pre-treatment methods for refractory gold ores have been described in the literature since the end of the nineteenth century. These methods have been combined in a lecture at Randol 3 (Proceedings Gold and Silver Recovery Forum 87, pp. 1885–97). The processes proposed include oxidation with $Ca(OCl)_2$, comminution, cyaniding with large quantities of lime, and cyaniding at elevated pressures in an autoclave. The article also makes apparent that these materials cannot be treated pyrometallurgically because of the excessively high gold losses that occur as a result of vaporisation or absorption in the brick lining of the surrounding vessel, among other things.

DETAILED DESCRIPTION OF THE INVENTION

In conjunction with creating and developing methods for processing ores from our deposit in Östra Åkulla, Sweden, where large concentrations of gold tellurides exist, it was surprisingly found possible to elevate the leaching yield of this material with cyanide treatment in conventional leaching circuits in the absence of any additional steps, e.g. by leaching at normal atmospheric pressure in the absence of any pre-treatment, to obtain a practically perfect leaching yield.

The method according to the invention is characterised in this regard by the method steps set forth in the accompanying Claims.

Thus, in accordance with the invention, the cyanide treatment is carried out at a temperature above room temperature up to a temperature immediately beneath the boiling point of the leaching liquid. The treatment is suitably carried out at a temperature of 60–80° C. A temperature of about 75° C. has been found particularly effective.

The treatment is carried out while delivering air in an alkaline environment, preferably at a pH between 10 and 12.

The invention will now be described in more detail with reference to a working example, including a comparison with conventional cyanide treatment.

EXAMPLE

Åkulla flotation concentrate containing gold tellurides was leached conventionally at room temperature (25° C.) and at a pH 11–12 on the one hand, and at elevated temperatures between 60 and 80° C. on the other hand. The gold content of the concentrate was about 170 g/t. Samples were taken after leaching times of mutually different duration, although only those samples taken after 10, 23, 50 and 72 hours are shown below for the sake of illustration.

TABLE showing the results obtained.

| Temp. ° C. | pH | Time Hours | Yield % |
|---|---|---|---|
| 25 | 11–12 | 10 | 5 |
| " | " | 23 | 10 |
| " | " | 50 | 20 |
| " | " | 72 | 40 |
| 60 | 12–12.5 | 10 | 22 |
| " | " | 23 | 48 |
| " | " | 50 | 88 |
| " | " | 72 | 95 |
| 70 | 11–11.5 | 10 | 13 |
| " | " | 23 | 35 |
| " | " | 50 | 95 |
| " | " | 72 | 99 |
| 75 | " | 10 | 42 |
| " | " | 23 | 48 |
| " | " | 50 | 92 |
| " | " | 72 | 99.8 |
| 80 | " | 10 | 15 |
| " | " | 23 | 45 |
| " | " | 50 | 75 |
| " | " | 72 | 98 |

The results obtained at 75° C. are the mean values of several test series with different degrees of dilution. Thus, only a 40% gold yield was obtained at room temperature after 72 hours. A corresponding yield of 99.8% was obtained in several trials at 75° C.

In summary, it can be said that the invention provides a number of advantages over earlier methods and proposed methods, these advantages including:

High gold yield.

Simple process layout.

Low investments and operating costs compared with methods which require pre-treatment processes, such as roasting and hypochlorite leaching, in order to increase leaching yields. No phase separation is necessary. The leached pulp can be led directly to conventional following steps in the process.

What is claimed is:

1. A method increasing the leaching yield of gold in the cyanide treatment of refractory ores containing gold tellurides or concentrates of such ores while delivering air in an alkaline environment at atmospheric pressure comprising conducting the cyanide treatment at a temperature from 60° C. to a temperature immediately beneath the boiling point of the leaching liquid.

2. The method of claim 1 wherein the cyanide treatment is conducted at a temperature of 60–80° C.

3. The method of claim 2 wherein the cyanide treatment is conducted at a pH of between 10 and 12.

4. The method of claim 1 wherein the cyanide treatment is conducted at a pH of between 10 and 12.

5. The method of claim 1 wherein the cyanide treatment is conducted at a temperature of about 75° C.

* * * * *